(12) United States Patent
Dillon, Jr. et al.

(10) Patent No.: US 11,366,526 B2
(45) Date of Patent: *Jun. 21, 2022

(54) SYSTEMS AND METHODS FOR PROVIDING VARIABLE HAPTIC FEEDBACK

(71) Applicant: Capital One Services, LLC, McLean, VA (US)

(72) Inventors: James R. Dillon, Jr., McLean, VA (US); Todd McPherson, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/379,157

(22) Filed: Jul. 19, 2021

(65) Prior Publication Data

US 2021/0349539 A1 Nov. 11, 2021

Related U.S. Application Data

(63) Continuation of application No. 16/540,296, filed on Aug. 14, 2019, now Pat. No. 11,086,399, which is a (Continued)

(51) Int. Cl.
*G06F 3/01* (2006.01)
*G06F 3/16* (2006.01)
(Continued)

(52) U.S. Cl.
CPC ............ *G06F 3/016* (2013.01); *G06F 3/0346* (2013.01); *G06F 3/041* (2013.01); *G06F 3/167* (2013.01); *G06F 3/0488* (2013.01)

(58) Field of Classification Search
CPC ........ G06F 3/016; G06F 3/0346; G06F 3/041; G06F 3/167; G06F 3/0488
See application file for complete search history.

(56) References Cited

U.S. PATENT DOCUMENTS

2002/0021277 A1\* 2/2002 Kramer .................. G06F 3/016
345/156
2002/0140625 A1\* 10/2002 Kidney ................ G06F 3/0346
345/1.1

(Continued)

*Primary Examiner* — Sejoon Ahn
(74) *Attorney, Agent, or Firm* — Perkins Coie LLP

(57) ABSTRACT

A system is provided for generating variable haptic feedback. The system comprises a first haptic feedback device configured to generate haptic feedback according to a received output signal, an input device configured to receive instructions from a remote source, the instructions comprising a haptic feedback output identifier, and a memory device for storing a plurality of haptic feedback profiles, the haptic feedback profiles defining unique haptic feedback patterns characterized at least by a duration and intensity of feedback to be generated by the first haptic feedback device, and said haptic feedback profiles being associated with a haptic feedback output identifier. The system also includes a processor configured to generate and transmit an output signal to the first haptic feedback device according to a haptic feedback profile associated with a received haptic feedback output identifier, said output signal comprising a haptic feedback pattern defined by said haptic feedback profile.

20 Claims, 4 Drawing Sheets

Related U.S. Application Data continuation of application No. 16/219,295, filed on Dec. 13, 2018, now Pat. No. 10,423,233, which is a continuation of application No. 15/336,765, filed on Oct. 27, 2016, now Pat. No. 10,248,207.

(60) Provisional application No. 62/247,441, filed on Oct. 28, 2015.

(51) Int. Cl.
  *G06F 3/041* (2006.01)
  *G06F 3/0346* (2013.01)
  *G06F 3/0488* (2022.01)

(56) References Cited

U.S. PATENT DOCUMENTS

| | | | |
|---|---|---|---|
| 2016/0277708 A1* | 9/2016 | Rintel | H04N 7/147 |
| 2019/0156994 A1* | 5/2019 | Cox | H01F 38/14 |

* cited by examiner

SYSTEMS AND METHODS FOR PROVIDING VARIABLE HAPTIC FEEDBACK

CROSS-REFERENCE TO RELATED APPLICATIONS

This application is a continuation of U.S. patent application Ser. No. 16/540,296, filed on Aug. 14, 2019, which is a continuation of U.S. patent application Ser. No. 16/219,295, filed on Dec. 13, 2018, now U.S. Pat. No. 10,423,233, issued on Sep. 24, 2019, which is a continuation of U.S. patent application Ser. No. 15/336,765, filed on Oct. 27, 2016, now U.S. Pat. No. 10,248,207, issued on Apr. 2, 2019, which claims priority to 35 U.S.C. § 119 to U.S. Provisional Patent Application No. 62/247,441, filed on Oct. 28, 2015. The contents of which are hereby incorporated by reference in their entirety.

BACKGROUND

Remote and mobile electronic computing devices provide convenient means for performing many functions over the Internet, including social networking, checking e-mail, conducting electronic transactions, etc. Many of these functions are performed using a dedicated application stored on or accessible to the computing device, general browser application, or other means for accessing the Internet. In the mobile banking industry, customers are increasingly turning to remote or mobile computing devices to conduct transactions with their financial service provider. For example, a user may operate a properly configured computing device to conduct or engage in certain mobile or online commerce or banking activities. But while users may enjoy the convenience of now remotely performing some banking activities using a computing-device, some users are still uncertain regarding confirmation of a transaction or confirmation of other steps completed in a remote transaction. Thus, mobile computing devices and applications need improved feedback mechanisms to provide distinguishable indications and to enhance the user experience.

Computing device applications typically provide visual and or audio indications to users to notify the user of their progress during a process or to provide other indications as part of the user's experience while interacting with the application. Some applications may also provide tactile or haptic feedback to provide certain indications. The haptic feedback provided by current systems, however, is typically generated with a constant timing, duration and intensity, and thus is incapable of providing meaningful distinguishing indications.

Thus, there is a need for systems and methods providing advanced feedback techniques to a user using a computing device. In particular, there is a need for systems and methods for providing variable haptic feedback to a user using a computing device.

SUMMARY

Disclosed embodiments provide systems and methods for generating variable haptic feedback to a user using an electronic computing device.

Consistent with a disclosed embodiment, a system is provided for generating variable haptic feedback. The system comprises a first haptic feedback device configured to generate haptic feedback according to a received output signal, an input device configured to receive instructions from a remote source, the instructions comprising a haptic feedback output identifier, and a memory device for storing a plurality of haptic feedback profiles, the haptic feedback profiles defining unique haptic feedback patterns characterized at least by a duration and intensity of feedback to be generated by the first haptic feedback device, and said haptic feedback profiles being associated with a haptic feedback output identifier. The system also includes a processor configured to generate and transmit an output signal to the first haptic feedback device according to a haptic feedback profile associated with a received haptic feedback output identifier, said output signal comprising a haptic feedback pattern defined by said haptic feedback profile.

A system is also provided for generating variable haptic feedback that comprises a first haptic feedback device configured to generate haptic feedback according to a received output signal, a memory device storing a plurality of haptic feedback profiles and a set of instructions, the haptic feedback profiles defining unique haptic feedback patterns characterized at least by a duration and intensity of feedback to be generated by the first haptic feedback device. The system also includes a processor configured to execute the instructions to receive an instruction signal to generate haptic feedback, determine a haptic feedback profile based on the received instruction signal, generate an output signal for controlling the first haptic feedback device based on the determined haptic feedback profile, and provide the output signal to the first haptic feedback device.

A non-transitory computer-readable medium is also provided according to the disclosed embodiments. The non-transitory computer-readable medium stores instructions that, when executed by a processor, cause the processor to perform operations including receiving an instruction signal to generate haptic feedback; identifying, based on the received instruction signal, a haptic feedback profile from among a plurality of haptic feedback profiles stored in a memory device, the haptic feedback profiles defining unique haptic feedback patterns characterized at least by a duration and intensity of feedback to be generated by a first haptic feedback device configured to generate haptic feedback according to a received signal; generating a signal for controlling the first haptic feedback device based on the identified haptic feedback profile; and providing the signal to the haptic feedback device.

A computer-implemented method is also provided for generating variable haptic feedback. The method includes receiving, by a processor, an instruction signal to generate haptic feedback; identifying, based on the received instruction signal, a haptic feedback profile from among a plurality of haptic feedback profiles stored in a memory device, the haptic feedback profiles defining unique haptic feedback patterns characterized at least by a duration and intensity of feedback to be generated by a first haptic feedback device configured to generate haptic feedback according to a received signal; generating a signal for controlling the first haptic feedback device based on the identified haptic feedback profile; and providing the signal to the haptic feedback device.

Consistent with another disclosed embodiment, a system is provided for generating variable haptic feedback. The system comprises an input device, said input device configured to receive indications of an external event, an output device, said output device configured to transmit a haptic feedback output identifier to an end receiver, and a memory device, said memory device comprising a haptic feedback output identifier database, said haptic feedback output identifier database associating a plurality of haptic feedback output identifiers with a plurality of potential external events. The system also includes a processor, said processor configured to determine a haptic feedback output identifier based on a received external event indicator, and instruct said output device to transmit said haptic feedback output identifier to an end receiver.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

The present disclosure provides systems and methods for generating variable haptic feedback to a user of a computing device. "Haptic feedback" may include feedback perceptible to a user via the sense of touch by applying, for example, forces, vibrations, or other movements to the user. The haptic feedback may be controlled to provide a signal indicative of a real world sound, speech or experience that may coincide with a user's interaction with the computing device or other activities performed using the computing device. Haptic feedback in the disclosed embodiments may be output with varied timing, duration, patterns, or intensity using a single haptic feedback device or in conjunction with additional haptic feedback devices. The haptic feedback may be generated based on a haptic feedback profile identifying haptic feedback timing, duration, pattern or intensities that mimic recognizable sounds or that provide unique indications personal to the user or the user's interaction with a computing device.

Numerous different haptic feedback profiles may be defined for a variety of user interactions with an application executed on the computing device. In some embodiments, variable haptic feedback may be provided together with a sound or visual indication.

Additional aspects of the disclosed embodiments are set forth below in this disclosure. Reference will now be made in detail to exemplary embodiments, examples of which are illustrated in the accompanying drawings and disclosed herein. Wherever convenient, the same reference numbers will be used throughout the drawings to refer to the same or like parts. In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

Figure 1:
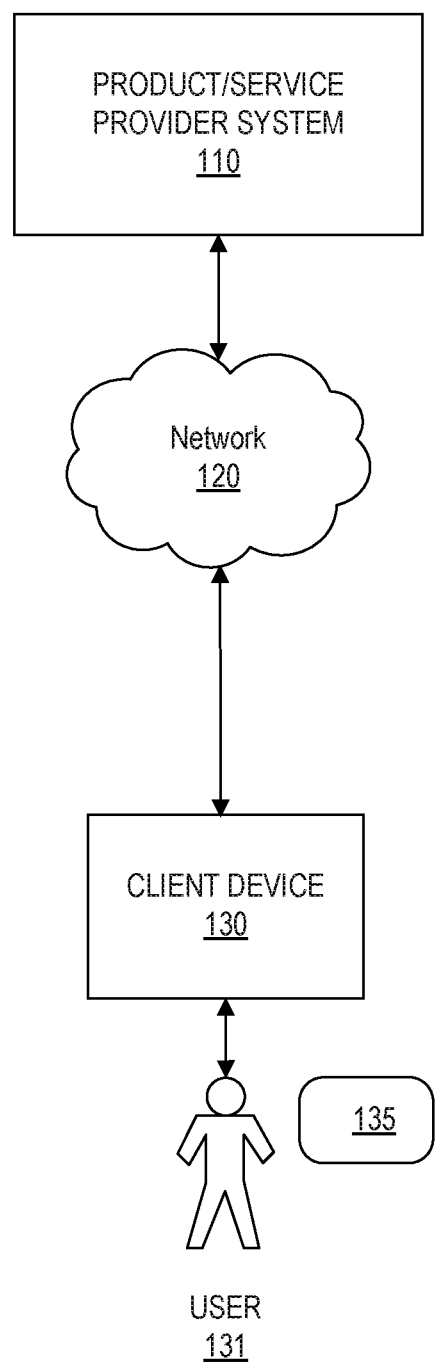
FIG. 1 is a diagram of an exemplary system that may be used to provide variable haptic feedback to a user, consistent with disclosed embodiments.

FIG. 1 is a block diagram of an exemplary system 100 for performing operations consistent with the disclosed embodiments. In some embodiments, system 100 may include one or more product/service provider systems 110, one or more client devices 130, one or more users 131, an electronic card 135, and a network 120.

In some embodiments, variable haptic feedback may be provided to user 131 operating a client device 130. Client device 130 may be a desktop computer, laptop, tablet, smartphone, multifunctional watch, pair of multifunctional glasses, tracking device, electronic card, electronic wearable device, or any suitable device with computing capability. Client device 130 may include one or more haptic devices for generating haptic feedback and executable software instructions for controlling the haptic device and for performing other aspects of the disclosed methods. In some embodiments, client device 130 includes executable software instructions provided as part of an application, or "app," associated with a product/service provider (included as part of 110) for performing operations associated with the product/service provider. A product/service provider may include a financial service provider associated with a financial service account. In some embodiments, the disclosed variable haptic feedback methods may be performed in association with user 131's interaction with the app or application executed on client device 130. Client device 130 is discussed in additional detail with respect to FIG. 2, below.

In some embodiments, user 131 may posses an electronic card 135 associated with a financial service entity. Electronic card 135 may comprise a credit card or debit card, or other membership or identification type card. Electronic card 135 may include certain hardware and software components to provide variable haptic feedback to user 131 according to the disclosed embodiments. Electronic card 135 is discussed in additional detail with respect to FIG. 3, below.

As further described herein, the disclosed methods may provide variable haptic feedback to user 131 operating client device 130, using electronic card 135, etc. to perform a transaction or other interaction with a product/service provider of product/service provider system 110. Product/service provider system 110 may be associated with any entity with which user 131 may communicate or interact with via, for example, client device 130. Product/service provider system 110 may provide functionality associated with a website or other network location accessible to client device 130 executing a browser application, dedicated app, or other program for interacting with product/service provider system 110. In some embodiments, product/service provider system 110 may be associated with a financial service entity that provides, maintains, manages, or otherwise offers financial services accessible via client device 130.

Product/service provider system 110 may include one or more computing devices (e.g., computer(s), server(s), etc.), memory storing data and/or software instructions (e.g., database(s), memory devices, etc.), and other known computing components configured to provide services to and/or interact with other components of system 100 (shown or not shown), such as client device 130, over network 120. In some embodiments, the computing components may include one or more processors configured to execute software instructions stored on one or more memory devices to perform operations consistent with the disclosed embodiments. In some embodiments, product/service provider system 110 may take the form of a server, special purpose computing device, a mainframe computer, or any combination of these components. In certain embodiments, product/service provider system 110 (or a system including product/service provider system 110) may be configured as a particular apparatus, system, and the like based on the storage, execution, and/or implementation of the software instructions that perform one or more operations consistent with the disclosed embodiments. Product/service provider system 110 may be a standalone system, or it may be part of a subsystem, which may be part of a larger system. Product/service provider system 110 may be a single server or may be configured as a distributed computer system including multiple servers or computers that interoperate to perform one or more of the processes and functionalities associated with the disclosed embodiments. The disclosed embodiments are not limited to any particular configuration of product/service provider system 110 or system 100.

Product/service provider system 110 and client device(s) 130 and/or electronic card 135 may be configured to communicate with each other over a network 120. Network 120 may comprise any type of computer networking arrangement configured to provide communications or exchange data, or both, between components of system 100. For example, network 120 may include any type of network (including infrastructure) that provides communications, exchanges information, and/or facilitates the exchange of information, such as the Internet, a private data network, a virtual private network using a public network, a Wi-Fi network, a LAN or WAN network, and/or other suitable connections that may enable information exchange among various components of system 100. Network 120 may also include a public switched telephone network ("PSTN") and/or a wireless cellular network. Network 120 may be a secured network or unsecured network. In some embodiments, one or more components of system 100 may communicate directly through a dedicated communication link(s).

It is to be understood that the configuration of the functional building blocks of system 100 have been defined herein for the convenience of the description. The components and arrangement of the components included in system 100 may vary. For example, in some embodiments, system 100 may include other components that perform or assist in the performance of one or more processes consistent with the disclosed methods. System 100 includes a number of components generally described as computing devices. Each of the computing devices may include any number of computing components particularly configured as a special purpose computing device to perform the functionality disclosed herein. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
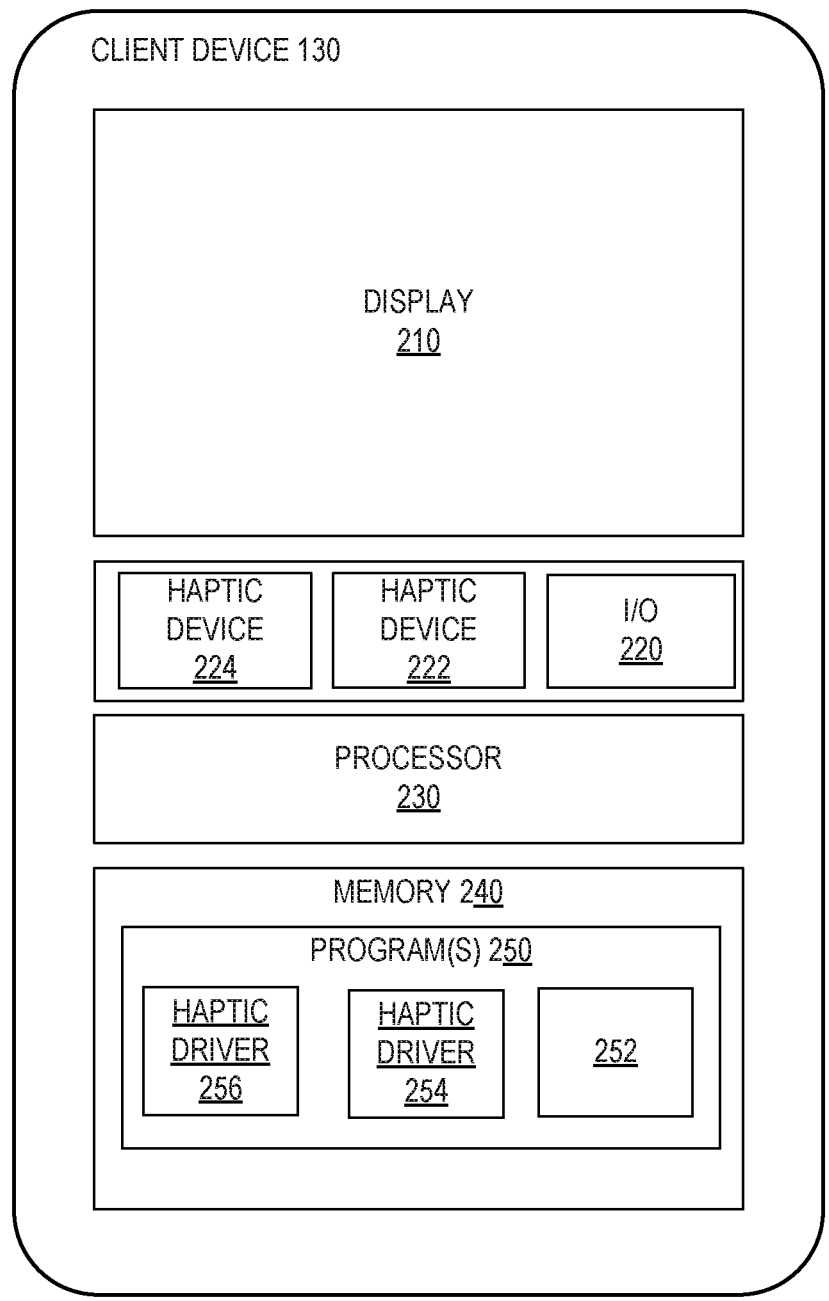
FIG. 2 is a diagram of an exemplary computing device, consistent with disclosed embodiments.

FIG. 2 shows an exemplary configuration of client device 130, consistent with disclosed embodiments. Client device 130 may enable a user 131 to operate client device 130 to perform remote interactions or mobile transactions with product/service provider system 110, for example, or receive information from product/service provider system 110. In some embodiments, client device 130 may be a personal computing device. For example, client device 130 may be a smartphone, a laptop or notebook computer, a tablet, or any mobile or wearable device with computing ability, or any combination of these computers and/or affiliated components.

Client device 130 may include one or more processors configured to execute software instructions stored in memory, such as memory 240 included in client device 130. Client device 130 may include software that when executed by a processor (e.g., processor 230) performs known Internet-related communication, content display processes, and other interactive processes for a user of client device 130. For instance, client device 130 may execute a browser or related mobile display software that generates and displays interfaces including content on a display device 210 included in, or in communication with, client device 130. Client device 130 may be a mobile device that executes mobile device applications and/or mobile device communication software that allows client device 130 to communicate with product/service provider system 110 and other components over network 120, and generates and displays content in interfaces via a display device 210 included in client device 130. The disclosed embodiments are not limited to any particular configuration of client device 130. Client device 130 may include any arrangement of one or more computing devices configured to perform one or more operations consistent with disclosed embodiments.

Client device 130 may be configured with storage that stores one or more operating systems that perform known operating system functions when executed by one or more processors. By way of example, the operating systems may include Microsoft Windows™, Unix™, Linux™, Android™, Apple™ Mac OS operating systems, or other types of operating systems. Accordingly, embodiments of the disclosed invention may operate and function with computer systems running any type of operating system. Client device 130 may also include communication software that, when executed by a processor, provides communications with network 120, such as Web browser software, tablet or smart handheld device networking software, etc.

Client device 130 may include a display 210 for displaying information. Display 210 may include, for example, liquid crystal displays (LCD), light emitting diode screens (LED), organic light emitting diode screens (OLED), a touch screen, and other known display devices. Display 210 may display various information to user 131. For example, display 210 may display an interactive interface to user 131 enabling user 131 to operate client device 130 to perform certain aspects of the disclosed methods. Display 210 may display touchable or selectable options for user 131 to select, and may receive user selection of options through a touch screen or I/O devices 220.

I/O devices 220 may include one or more devices that allow client device 130 to send and receive information or interactions from user 131 or another device. For example, I/O devices 220 may include various input/output devices, such as a keyboard, a mouse-type device, a gesture sensor, an action sensor, a physical button, switch, microphone, touchscreen panel, stylus, etc. that may be manipulated by user 131 to input information using client device 130. I/O devices 220 may also include an audio output device, such as a speaker configured to provide sound and audio feedback to user 131 operating client device 130. In some embodiments, I/O devices 220 may include a light emitting component, such as an LED or other component capable of providing a visible signal to user 131. I/O devices 220 may also include one or more communication modules (not shown) for sending and receiving information from other components in system 100 by, for example, establishing wired or wireless connectivity between client device 130 and network 120. Exemplary communication modules as I/O devices 220 may include, for example, a short-range or near field wireless communication modem, a Wi-Fi communication modem, or a cellular communication modem.

In the disclosed embodiments, client device 130 may include one or more haptic devices 222, 224 configured to provide haptic feedback to user 131 operating client device 130. Haptic devices 222, 224 may be configured to provide haptic feedback in the form of vibrations, movements, or other forces perceptible to user 131 by a sense of touch. The vibrations, movements, or other forces may be applied to a housing of client device 130 or as force feedback to one or more I/O devices 220 such as a button or keyboard, for example. Haptic devices 222, 224 may be provided in various locations and/or configured within client device 130 to achieve particular effects. For example, in some embodiments, haptic devices 222, 224 may be provided such that haptic feedback is experienced on a single surface or edge of client device 130, in a localized portion of client device, etc. Haptic devices 222, 224 may be provided throughout client device 130 to generate unique effects when operated in conjunction, such as to provide haptic feedback evoking movement across client device 130 (e.g., engaging/disengaging multiple haptic devices 222, 224 dispersed within client device 130 in a predetermined sequence from first end of client device 130 to a second end). Any number of haptic devices 222, 224 or other sensory feedback devices may be included in client device 130.

Haptic devices 222, 224 may include any devices capable of providing haptic feedback in the form of motion, vibration, or other forces, for example. In some embodiments, haptic devices 222, 224 may include any devices capable of being controlled to exhibit variable speed vibrations or movements, and with variable intensities. Exemplary haptic devices 222, 224 may include an electric motor with an off-centered rotatable mass or weight that generates vibrations when rotated. Other exemplary haptic devices may include an electromagnetic actuator, which may include a magnetic mass surrounded by a coil to which an electric field may be applied to drive the magnetic mass to provide vibrations based on changes in the electric field. A voicecoil is another example of an electromagnetic actuator that may be used to provide haptic feedback. Other haptic devices 222, 224 may include a piezoelectric actuator or motor that can generate movement based on an applied electric field. Any combination of these and other exemplary devices capable of generating haptic feedback may be implemented in client device 130. In some embodiments, haptic devices 222, 224 may be configured to provide haptic feedback perceptible to a user at variable speeds or intensities. Operation of haptic devices 222, 224 may be effected by a control signal of varying amplitude, duration, or frequency to modulate the speed and intensity of the haptic feedback generated by haptic devices 222, 224 according to a desired pattern. Numerous control signals may be defined according to a plurality of haptic feedback profiles representing the desired patterns of haptic feedback.

Client device 130 may include at least one processor 230, which may be one or more known computing processors, such as a microprocessor from the Snapdragon™ family manufactured by Qualcomm™, the Exynos™ family manufactured by Samsung™, or any of various processors manufactured by Apple™, for example. Processor 230 may constitute a single core or multiple core processor that executes parallel processes simultaneously. For example, processor 230 may be a single core processor configured with virtual processing technologies. In certain embodiments, processor 230 may use logical processors to simultaneously execute and control multiple processes. Processor 230 may implement virtual machine technologies, or other known technologies to provide the ability to execute, control, run, manipulate, store, etc. multiple software processes, applications, programs, etc. In another embodiment, processor 230 may include a multiple-core processor arrangement (e.g., dual core, quad core, etc.) configured to provide parallel processing functionalities to allow client device 130 to execute multiple processes simultaneously. One of ordinary skill in the art would understand that other types of processor arrangements could be implemented that provide for the capabilities disclosed herein. The disclosed embodiments are not limited to any type of processor(s) configured in client device 130. Processor 230 may execute various instructions stored in client device 130 to perform various functions of the disclosed embodiments described in greater detail below. In some embodiments, processor 230 is configured to provide control or command signals to one or more of haptic devices 222, 224 based on a haptic feedback profile. In some embodiments, a haptic feedback profile may also indicate audio or visual feedback to be provided to a user using a speaker or lighting component provided as I/O devices 220, for example, or display 210.

Client device 130 may include a memory 240, which may be a volatile or non-volatile, magnetic, semiconductor, optical, removable, non-removable, or other type of storage device or tangible (i.e., non-transitory) computer-readable medium.

Memory 240 may store one or more programs 250. Programs 250 may include operating systems (not shown) that perform known operating system functions when executed by one or more processors. Disclosed embodiments may operate and function with computer systems running any type of operating system.

Client device 130 may be a device that executes mobile applications for performing operations consistent with disclosed embodiments, such as a tablet, smartphone, or other mobile computing device. Thus, in some embodiments, client device 130 may have an application 252 installed thereon, which may enable client device 130 to communicate with product/service provider system 110 via network 120 and perform aspects of the disclosed methods. For example, client device 130 may connect to product/service provider system 110 through the use of browser software to access and receive information or perform other operations associated with a product/service provider. In some embodiments, the disclosed variable haptic feedback methods may be initiated in response to user interaction with application 252 executed on client device 130. Certain aspects of the disclosed methods for providing variable haptic feedback may be provided as part of an application 252.

For example, in some embodiments, application 252 may provide an instruction to generate haptic feedback based on a user's interaction with the application 252. In other embodiments, application 252 may receive an instruction to generate haptic feedback in a communication with product/service provider system 110. Application 252 may also include a software module for determining a command or control output signal to be provided to haptic device 222, 224, or to a haptic driver 254, 256 based on the generated or received instruction. In some embodiments, the command or control output signal may be determined based on a haptic feedback profile defining a pattern and/or intensity of haptic feedback to be generated by one or more haptic devices 222, 224. In some embodiments, the instruction received from product/service provider system 110 may include a haptic feedback output identifier associated with a haptic feedback profile.

In some embodiments, programs 250 may include one or more software modules or haptic drivers 254 and 256 including sets of instructions for controlling operation of haptic devices 222, 224, respectively. In some embodiments, a haptic driver may be provided for each haptic device. In other embodiments, a single haptic driver may be provided for all haptic devices. In still other embodiments, a haptic driver may be provided for each type of haptic device. Haptic drivers 254, 256 may control operation of haptic devices 222, 224 according to a plurality of haptic feedback profiles, which may be stored in memory 240. The haptic feedback profiles may define commands or control output signals that represent patterns and/or intensities of haptic feedback to be generated by one or more haptic feedback devices. In some embodiments, a haptic feedback profile may define an operation incorporating multiple feedback devices. Thus, one or more haptic drivers 254, 256 may be executed in coordination (e.g., simultaneously, and/or sequentially, and/or intermittently, etc.), to provide a desired effect achieved by a combined effect of haptic feedback from the multiple haptic devices 222, 224. While described above as a software module stored in memory 240, in other embodiments, a haptic driver may be configured as a drive circuit or other hardware configuration. In other implementations, a haptic driver may also be provided as firmware for haptic devices 222, 224.

Figure 3:
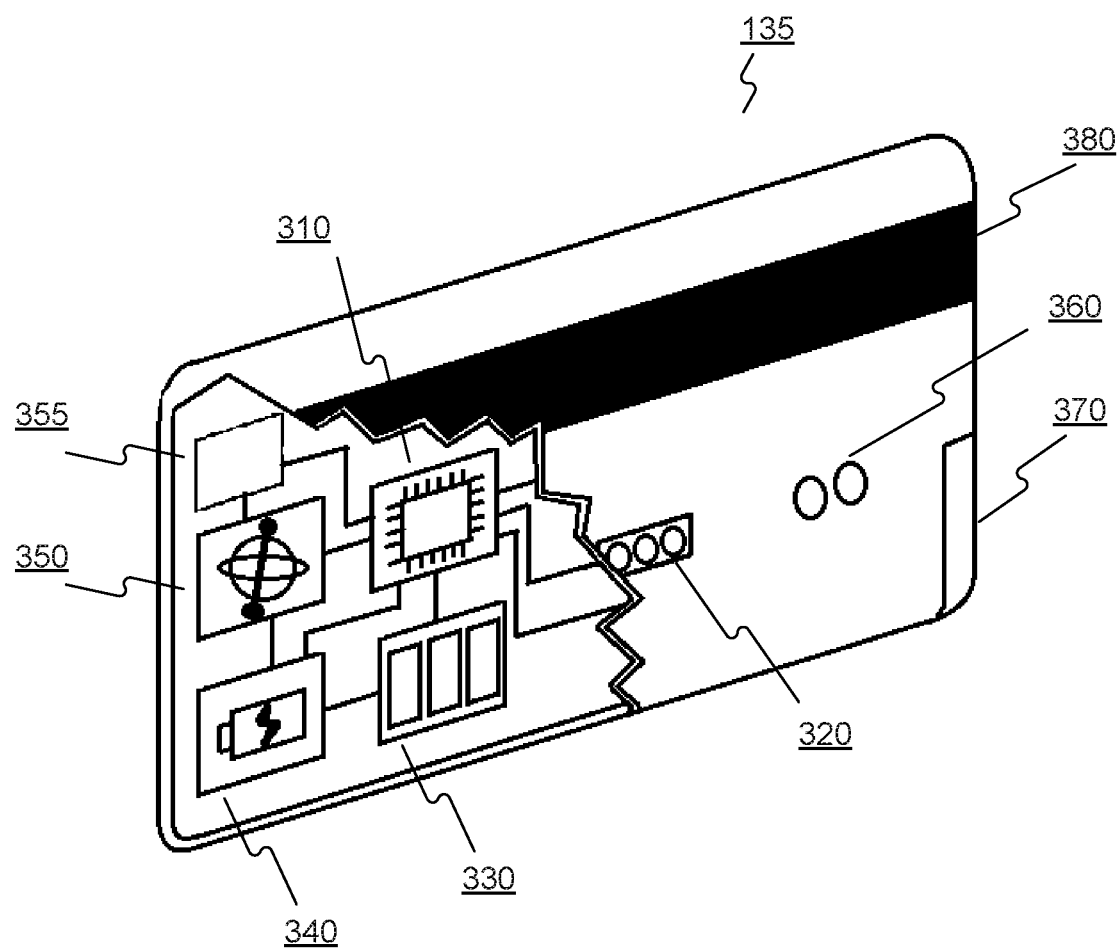
FIG. 3 is a diagram of an exemplary electronic card, consistent with disclosed embodiments.

FIG. 3 shows a diagram of an exemplary electronic card 135, consistent with disclosed embodiments. In some embodiments, electronic card 135 may be the approximate size and shape of a traditional transaction card, such as a credit card. Electronic card 135 may have embedded electronics for performing aspects of the disclosed variable haptic feedback methods. As shown, electronic card 135 may include processor 310, display element 320, memory 330, power source 340, one or more sensors 350, one or more haptic feedback device(s) 355, input devices 360, antenna 370, and magnetic stripe 380. In some embodiments, electronic card 135 may include more or fewer components than shown in FIG. 3.

Processor 310 may comprise one or more known or specialized processing devices, of sufficient size and form factor to fit within electronic card 135 when configured to be about the size of a traditional transaction card. In some embodiments, processor 310 may include any configuration capable of performing functions related to the disclosed methods such as, for example, generating variable control or command signals for a haptic device(s) 355, which may be generated based on haptic feedback profiles stored in memory 330. Processor 310 may also control power source 340, send and receive data, read from and write to memory 330, receive and analyze data from sensors 350, generate information for presentation on display 320, receive and process input from I/O devices 360, and any other functions consistent with the disclosed embodiments.

Haptic device(s) 355 may be configured and/or disbursed across electronic card 135 similar to haptic devices 222, 224 of client device 130 described above with respect to FIG. 2 for generating variable haptic feedback to a user possessing electronic card 135 based on a haptic feedback profile stored in memory 330. Other aspects of electronic card 135 may include a display 320, which may comprise a screen, indicator light, or other appropriate device for displaying a status or message to user 131. In some embodiments, display 320 may include a small LCD screen, e-ink screen, or OLED display or one or more LEDs. In some embodiments, display 320 may provide notifications, prompts, and/or messages to user 131. Such notifications may be generated as defined by a haptic feedback profile according to some embodiments.

Memory 330 may include a volatile or non-volatile, magnetic, semiconductor, or other type of storage device or tangible (i.e., non-transitory) computer-readable medium that stores one or more haptic feedback profiles, user information, and other computer-executable instructions.

Power source 340 may include a power storage device such as a battery or capacitor, a power receiver such as an inductive power coil or a wireless power receiver, a power generator such as a solar or kinetic power generator, or any combination thereof. In some embodiments, power source 340 may include one or more other known devices capable of generating, receiving, and/or storing electrical energy.

Sensors 350 may include one or more devices capable of sensing the environment around electronic card 135 and/or movement of electronic card 135. In some embodiments, sensors 350 may include, for example, an accelerometer, a shock sensor, a gyroscope, a position sensor, a microphone, an ambient light sensor, a temperature sensor, and/or a conductivity sensor.

Input devices 360 may include one or more buttons, switches, or other forms of input mechanisms for receiving an indication or instruction from user 131. In some embodiments, input devices 360 may receive a sequence or series of inputs, to cause processor 310 to perform various functions associated with the disclosed embodiments.

In some embodiments, electronic card 135 may include antenna 370, for transmitting and/or receiving data from one or more external locations. Antenna 370 may comprise a short-range wireless transceiver, or a near-field communication chip. Antenna 370 may be configured to communicate with client device 130 or other systems such as a contactless card reader or other sensors configured to detect the presence of electronic card 135.

In some embodiments, electronic card 135 may include magnetic stripe 380. In some embodiments, magnetic stripe 380 may be controlled by processor 310. For example, processor 310 may write, clear, and rewrite magnetic stripe 380, to provide particular account information.

Client device 130 and electronic card 135, described above, are only exemplary devices for providing variable haptic feedback to a user according to the disclosed embodiments. Other devices capable of implementing suitable computing components and that may be manipulated by a user may also be used to provide variable haptic feedback according to the disclosed embodiments. For example, in some embodiments, variable haptic feedback may be provided to a user in the form of a stylus, mouse, remote control, and/or other input devices as may be apparent from the disclosed embodiments.

The following processes are directed to various embodiments for providing variable haptic feedback to user 131, based on the user's interaction with client device 130 and or product/service provider system 110. The following processes may be performed by various aspects and components of client device 130 or product/service provider system 110 as is apparent from the disclosure.

Figure 4:
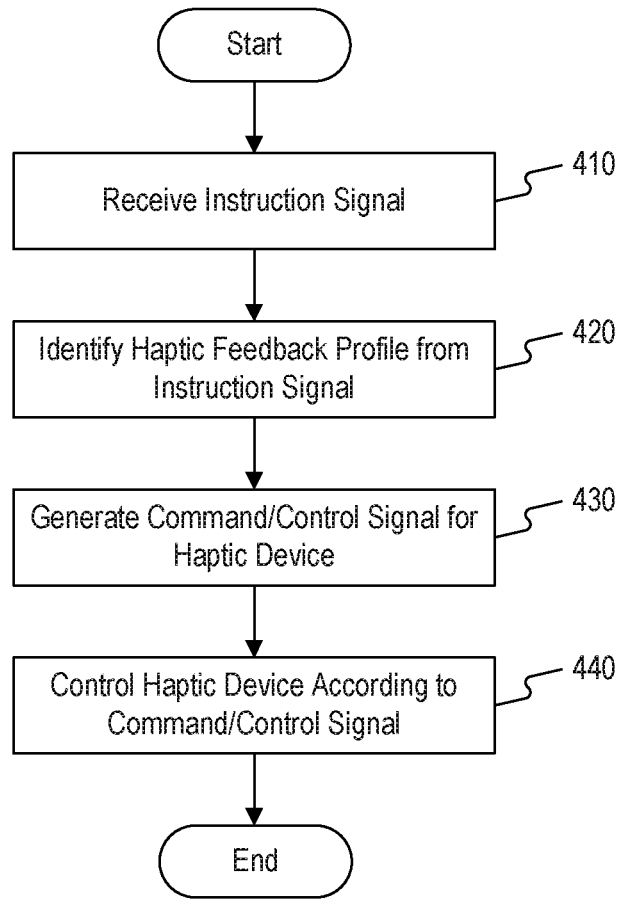
FIG. 4 is a flowchart of an exemplary variable haptic feedback process, consistent with disclosed embodiments.

FIG. 4 illustrates a flow chart of a variable haptic feedback process 400 for providing variable haptic feedback to a user according to some embodiments. In some embodiments, process 400 may be executed, in part, in conjunction with a user's interaction with an application, such as application 252 executed on client device 130. In some embodiments, the variable haptic feedback provided to a user interacting with application 252 may be specific to a particular application 252 or a particular product/service provider system 110. Thus, in some embodiments, a user may associate certain variable haptic feedback as being unique to application 252 or a particular product/service provider system 110. Thus, variable haptic feedback process 400 may be implemented to distinguish application 252 or a particular product/service provider system 110 and to enhance a user's experience when interacting with application 252.

For ease of discussion, variable haptic feedback process 400 is described with respect to a user's interaction with a financial services application 252 executed on client device 130, and/or electronic card 135. In this embodiment, financial services application 252 is associated with product/service provider system 110 of a financial services provider. It should be understood, however, that haptic feedback process 400 is not limited to the financial services industry and, instead, may be employed in any environment where haptic feedback may provide feedback information of any kind to a user. Such environments could include other non-financial applications, to provide haptic feedback to indicate confirmation of a communication or successful task completion. Some embodiments may provide haptic feedback as confirmation of a user's identity to indicate successful authentication or verification, for example. This could be used in environments providing restricted access to buildings and spaces, such as hotels, apartments, or other restricted access locations, based on presentation of a credential including a key device or electronic card. The presentation credential may be configured to provide haptic feedback to indicate the approval or decline of entry access and other distinct indications. Process 400 may also be used to provide haptic feedback communicating situational awareness, location information, wayfinding, or other cautionary messaging in regard to personal safety based on positional information received from beacons or other positional tracking methods.

At operation 410, financial services application 252 may receive an instruction signal to generate variable haptic feedback. Prior to or in response to first operation 410, financial services application 252 may be executed on client device 130 to communicate over network 120 with product/service provider system 110, which maybe a financial services provider.

In some embodiments, the product/service provider system 110 may include one or more communication interfaces or input/output devices configured to communicate remotely with client device 130 via network 120 to receive one or more indications of external events associated with the user's interaction with product/service provider system 110. The product/service provider system 110 may also include a memory device, including a haptic feedback identifier database, for example, that stores associations of a plurality of haptic feedback output identifiers corresponding to a plurality of potential external events associated with the user's interaction. Responsive to receiving an indication of an external event, a processor associated with product/service provider system 110 may determine a haptic feedback output identifier based on the received external event indicator to be transmitted in an instruction signal to the client device 130. The processor may instruct a communication interface or output device to transmit the determined haptic feedback output identifier to the client device 130 as part of an instruction signal, for example.

In some embodiments, the instruction signal may be generated and/or received (in whole or in part) by client device 130. For example, in first operation 410, financial services application 252 may receive via a communication module as I/O device 220, for example, instructions or an instruction signal communicated from product/service provider system 110 associated with beginning a transaction or other interaction with the financial service provider. For example, the first instruction signal may be received upon authenticating a user to access financial services application 252 and/or product/service provider system 110. The first instruction signal may indicate an instruction for the client device 130 (or electronic card 135) to generate haptic feedback to a user according to a haptic feedback profile. The instructions or instruction signal received from product/service provider system 110 may include a haptic feedback output identifier associated with a haptic feedback profile stored on the client device 130. The haptic feedback profile may be associated with product/service provider system 110, associated with the user identified in operation 420, and/or associated with the particular client device 130 (or electronic card 135) configuration receiving the instruction signal, etc.

The first instruction signal may, for example, include a haptic feedback output identifier to indicate a desired haptic feedback profile corresponding to a "welcome announcement" welcoming a user to the application, a "confirmation announcement" confirming the user's authentication by product/service provider system 110, a "signature announcement" identifying a proprietary recognizable signature of the product/service provider system 110, or any other suitable announcement. In some embodiments, the first instruction signal may be provided as part of a display signal, audio signal, or other signal providing instructions to client device for displaying or outputting content to a user.

In operation 420, a corresponding haptic feedback profile is identified based on the received instruction signal. In some embodiments, the instruction signal may include information defining the haptic feedback profile. In other embodiments, the received instruction signal may include a haptic feedback output identifier corresponding to a haptic feedback profile. The identifier may be used to determine a desired haptic feedback profile from a plurality of haptic feedback profiles stored in memory 240, for example. In this example, a haptic feedback profile corresponding to the "welcome announcement," "confirmation announcement," or "signature announcement" may be identified based on the received instruction signal. By way of example, a haptic feedback profile associated with a "welcome announcement" may identify a pattern and/or intensity of variable haptic feedback that mimics or emulates the phonetic sequence of an announcement welcoming the user to the application, such as the phonetic sequence for "welcome." In other words, in this embodiment, a timing pattern, duration, and intensity for generating haptic feedback as defined in the haptic feedback profile may emulate spoken words. Similarly, a haptic feedback profile associated with a "confirmation announcement" may identify a pattern and/or intensity of variable haptic feedback that mimics or emulates an announcement either confirming (e.g., "authentication granted") or denying the user's authentication (e.g., "please try again") to interact with an application. And a haptic feedback profile associated with a "signature announcement" may identify a pattern and/or intensity of variable haptic feedback that uniquely identifies the product/service provider, for example, with which the user is interacting via an application. In some embodiments, for example, the "signature announcement" may correspond to a succession of distinct pitches associated with the product/service provider. In other embodiments, the "signature announcement" may correspond to a logo, symbol, insignia, graphic, or other distinct mark associated with the product/service provider. For example, the product/service provider may be visually identified by a "swoosh," and the haptic feedback profile associated with a "signature announcement" may identify the timing, duration, patterns, and/or intensity for the haptic device(s) 222, 224 (or haptic device(s) 355) to generate coordinated variable haptic feedback between the devices to emulate one or more visual characteristics of the "swoosh," as discussed below.

Upon identifying a haptic feedback profile in operation 420, a command and/or control output signal may be generated for a haptic device according to the haptic feedback profile (operation 430). In some embodiments, a command signal may be generated when, for example, a haptic device 222 and/or 224 includes firmware that may in turn generate a corresponding control signal for controlling operation of a haptic device 222, 224. A command signal may also be provided to a haptic driver 254, 256 that may in turn generate a control signal for controlling operation of a haptic device 222, 224. In other embodiments, a control signal may be generated based on the identified haptic feedback profile for controlling operation of a haptic device 222, 224. In some embodiments, one or more command and/or control signals corresponding to one or more haptic devices 222, 224 may be generated for outputting a coordinated variable haptic feedback to a user to produce a desired effect.

In operation 440, the generated command or control signal (or signals) is provided to one or more haptic devices to control the haptic feedback output to a user based on the haptic feedback profile. Additionally, in some embodiments a display signal and/or audio signal may be generated according to an identified haptic feedback profile for outputting audio and or visual feedback to a user in conjunction with haptic feedback of the disclosed methods.

Process 400 may be repeated to generate additional haptic feedback according to subsequent events or interactions with the financial services application 252, for example. In some embodiments, an instruction signal to generate haptic feedback may be received based on a number of different interactions, such as to indicate completion of a transaction using the financial services application 252, for example. One or more haptic feedback profiles may be defined according to different types of transactions. In some embodiments, a debit transaction may be associated with a haptic feedback profile that emulates a cash register's "cha-CH-ING" sound. Another haptic feedback profile that emulates a spoken sound of "ta da" or a confirmation phrase ("payment sent," "deposit approved," etc.) may be associated with completion of a purchase transaction. Numerous other haptic feedback profiles may be generated to correspond to any number of events or interactions associated with the financial services application. Some haptic feedback profiles may also correspond to user notifications, such as to warn the user that an account balance is running low, for example. In some embodiments, the haptic feedback profile may comprise a mathematical algorithm for converting text, sounds, visual images, etc. to timing, duration, patterns, and/or intensities for generating coordinated variable haptic feedback that emulates the text or visual images. The above example events are provided by way of example only. Numerous other events or interactions with an application may be a cause to provide a desirable variable haptic feedback to a user.

As indicated above, in some embodiments, process 400 may be similarly performed by electronic card 135. For example, electronic card 135 may receive an instruction signal in operation 410 via antenna 370. The instruction signal may be received from a client device 130 or from other known card readers or sensors configured to communicate with electronic card 135. In other embodiments, processor 310 may generate an instruction signal based on a sensor detected using antenna 370, for example. Processor 310 may the identify a haptic feedback profile based on the received instruction signal (operation 420), generate a command or control signal for haptic device(s) 355 (operation 430) and enable control of haptic device 355(s) according to a haptic feedback profile by providing the command or control signal to haptic device 355(s) (operation 440). Process 400 may also be similarly implemented using other devices such as a stylus, mouse, remote control device, or other input device operated by a user.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for generating variable haptic feedback, the system comprising:
a haptic device configured to generate haptic feedback according to a control signal, wherein the haptic device is associated with a mobile computing device;
an input device configured to receive an instruction signal from a remote source to the mobile computing device, the instruction signal comprising a haptic feedback output identifier, wherein the instruction signal is selected based on an interaction with an application, and wherein the remote source is associated with the application, and wherein the haptic feedback output identifier is associated with a haptic feedback profile defining a pattern of the haptic feedback generated by the haptic device; and
a processor configured to generate and transmit the control signal to the haptic device based on the haptic feedback profile associated with the haptic feedback output identifier.

2. The system of claim 1, wherein the haptic feedback profile defines an audio or a visual feedback associated with the haptic feedback.

3. The system of claim 2, wherein (i) the mobile computing device includes a speaker or lighting component and (ii) the audio or the visual feedback is provided using the speaker or lighting component.

4. The system of claim 1, wherein the remote source is associated with a product or service provider.

5. The system of claim 1, wherein the interaction is associated with a completion of a transaction completed using the application.

6. The system of claim 1, wherein the control signal comprises at least one of varying amplitude, frequency, or duration according to the haptic feedback profile.

7. The system of claim 1, wherein the haptic feedback profile is associated with the application.

8. A non-transitory computer-readable medium storing instructions that, when executed by one or more processors, cause the one or more processors to perform operations comprising:
   receiving, from a remote source at a mobile computing device, an instruction signal to generate haptic feedback, wherein the instruction signal is selected based on an interaction with an application, and wherein the remote source is associated with the application;
   identifying, based on the instruction signal, a haptic feedback profile defining a pattern of haptic feedback to be generated by a haptic device, wherein the haptic device is associated with the mobile computing device;
   generating a control signal for controlling the haptic device based on the haptic feedback profile; and
   providing the control signal to the haptic device.

9. The non-transitory computer-readable medium of claim 8, wherein the haptic feedback profile defines an audio or a visual feedback associated with the haptic feedback.

10. The non-transitory computer-readable medium of claim 9, wherein (i) the mobile computing device includes a speaker or lighting component and (ii) the audio or the visual feedback is provided using the speaker or lighting component.

11. The non-transitory computer-readable medium of claim 8, wherein the remote source is a system associated with a product or service provider.

12. The non-transitory computer-readable medium of claim 8, wherein the interaction is associated with a completion of a transaction completed using the application.

13. The non-transitory computer-readable medium of claim 8, wherein the control signal comprises at least one of varying amplitude, frequency, or duration according to the haptic feedback profile.

14. The non-transitory computer-readable medium of claim 8, wherein the haptic feedback profile is associated with the application.

15. A method for generating variable haptic feedback, the method comprising:
   receiving, from a remote source at a mobile computing device, an instruction signal to generate haptic feedback, wherein the instruction signal is selected based on an interaction with an application, and wherein the remote source is associated with the application;
   identifying, based on the received instruction signal, a haptic feedback profile defining a pattern of haptic feedback to be generated by a haptic device, wherein the haptic device is associated with the mobile computing device;
   generating a control signal for controlling the haptic device based on the identified haptic feedback profile; and
   providing the control signal to the haptic device.

16. The method of claim 15, wherein the haptic feedback profile defines an audio or a visual feedback associated with the haptic feedback.

17. The method of claim 16, wherein (i) the mobile computing device includes a speaker or lighting component and (ii) the audio or the visual feedback is provided using the speaker or lighting component.

18. The method of claim 15, wherein the remote source is a system associated with a product or service provider.

19. The method of claim 15, wherein the interaction is associated with a completion of a transaction completed using the application.

20. The method of claim 15, wherein the control signal comprises at least one of varying amplitude, frequency, or duration according to the haptic feedback profile.

* * * * *